United States Patent

Steele

[11] 3,708,207
[45] Jan. 2, 1973

[54] HIGH PRESSURE BOOSTER VALVE
[75] Inventor: James R. Steele, St. Paul, Minn.
[73] Assignee: Dynamic Air Inc., Saint Paul, Minn.
[22] Filed: April 16, 1971
[21] Appl. No.: 134,764

Related U.S. Application Data

[63] Continuation-in-part of Ser. No. 886,091, Dec. 18, 1969, abandoned.

[52] U.S. Cl. .................302/24, 137/525.3, 302/29, 302/35
[51] Int. Cl. ..........................B65g 53/28, B65g 53/58
[58] Field of Search.......137/516.25, 516.27, 516.29, 137/525, 525.3, 155, 604, 605; 251/145; 277/208; 302/24, 35, 64, 29

[56] References Cited

UNITED STATES PATENTS

| 3,499,461 | 3/1970 | Tuma | 137/240 |
| 3,539,149 | 11/1970 | Breny | 251/145 |
| 2,489,715 | 11/1949 | Mark et al. | 277/208 X |
| 2,897,005 | 7/1959 | Wiltse | 302/24 |
| 2,265,615 | 12/1941 | Stalter | 277/208 |
| 3,065,761 | 11/1962 | Peras | 137/525 X |
| 2,946,628 | 7/1960 | Bauregger | 302/24 |
| 2,794,686 | 6/1957 | Anselman et al. | 302/24 |
| 1,733,302 | 10/1929 | Horn | 302/64 X |

Primary Examiner—Evon C. Blunk
Assistant Examiner—W. Scott Carson
Attorney—Stryker & Jacobson

[57] ABSTRACT

A pneumatic conveyor tube booster valve constructed from an annular tapered rubber sleeve in line with the tube and a sealed pressurized housing surrounding the sleeve portion of the tube. Pressurized gas introduced into the housing escapes past the rubber sleeve when the tube pressure drops below the housing pressure by a predetermined amount and enters the tube in substantially the same direction in which material in the tube is moving. Annular lips on the conveyor tubes supports the rubber sleeve against pressures in the tube.

7 Claims, 3 Drawing Figures

INVENTOR
JAMES R. STEELE
BY Stryker & Jacobson
ATTORNEYS

INVENTOR
JAMES R. STEELE
BY  Stryker + Jacobson
ATTORNEYS

HIGH PRESSURE BOOSTER VALVE

BACKGROUND OF THE INVENTION

This application is a continuation-in-part of my copending application Ser. No. 886,091, filed Dec. 18, 1969, for a "Pneumatic Conveyor Booster Valve," in the name of the instant inventor, now abandoned.

Pneumatic conveyors are often employed for a wide variety of conveyor applications including the transfer of dry granular material such as sand, salt, flour, and cement. Two types of systems are in general use for the transfer of granular materials. The first type depends upon a high velocity air stream to carry a relatively small amount of material at high speeds. Serious disadvantages accompany this method. The high speed of the particles tends to abrade the interior surfaces of the conveyor tubes. Hence, continual maintenance is a necessity and frequent operational shutdowns are required to repair and replace parts. In addition, the high velocity impacts which are unavoidable in this type of system destroy the transported material or reduce it to an undesirably low grain size.

A preferred type of pneumatic conveyor which avoids the above problems is the slow speed variety in which the conveyor tube is practically full of material which material is moved by air pressure applied to it at its source and at a number of successive locations along the conveyor tube. Although the speed of the material is less, the density is so much higher that the net volume moved per unit time is much higher. Furthermore, wear is reduced both on the conveyor tube and on the material.

The present invention pertains to the booster valves positioned along the conveyor tube which function to add pressure as required to keep the material moving. Prior art booster valves are extremely difficult to adjust. If too much pressure is applied, the material in the conveyor tube is blocked. On the other hand, if the pressure is too low, the material is not properly transported. Since the proper applied pressure depends on the pressure inside the tube and since the pressure in the tube varies with the material density, flow rate, consistency, and the pressure applied by adjacent booster valves, it is readily apparent how difficult it is to achieve the correct pressure. Continual adjustments are necessary to maintain the careful balance of the system. One method of simplifying this type of pneumatic conveyor system is to employ one-way valves in the booster stations which operate to release pressurized gas into the tube when the pressure in the tube drops below a predetermined value. However, these valves usually become clogged due to material in the channels leading from the conveyor tubes to the one way booster valve backing up into the valve before it can close. The backed up material soon scores the sealing surfaces and valve replacement becomes necessary. My invention contemplates an improved booster-valve design which avoids the above-mentioned problems.

SUMMARY OF THE INVENTION

Briefly, a unique booster valve design is contemplated which does not clog and which injects air into the conveyor tube about the entire circumference of the tube. An annular tapered rubber sleeve is positioned in line with the conveyor tube. A sealed pressurized housing encloses the section of tube containing the rubber sleeve so that air introduced into the housing can displace the sleeve and enter the tube when the pressure in the tube drops below the housing pressure by a predetermined amount. In one embodiment, the conveyor tube is flared so as to surround the rubber sleeve and provide support to the sleeve against abnormal pressure rises in the tube. Thus, it may be seen that it is an object of my invention to provide an improved booster valve. It is another object of my invention to provide a valve that can withstand large back pressures and which has no material collecting indentations or passageways in the conveyor tube which induce clogging. Further objects and advantages will become apparent from the following description and drawings.

DESCRIPTION OF THE PREFERRED EMBODIMENT

Figure 1:
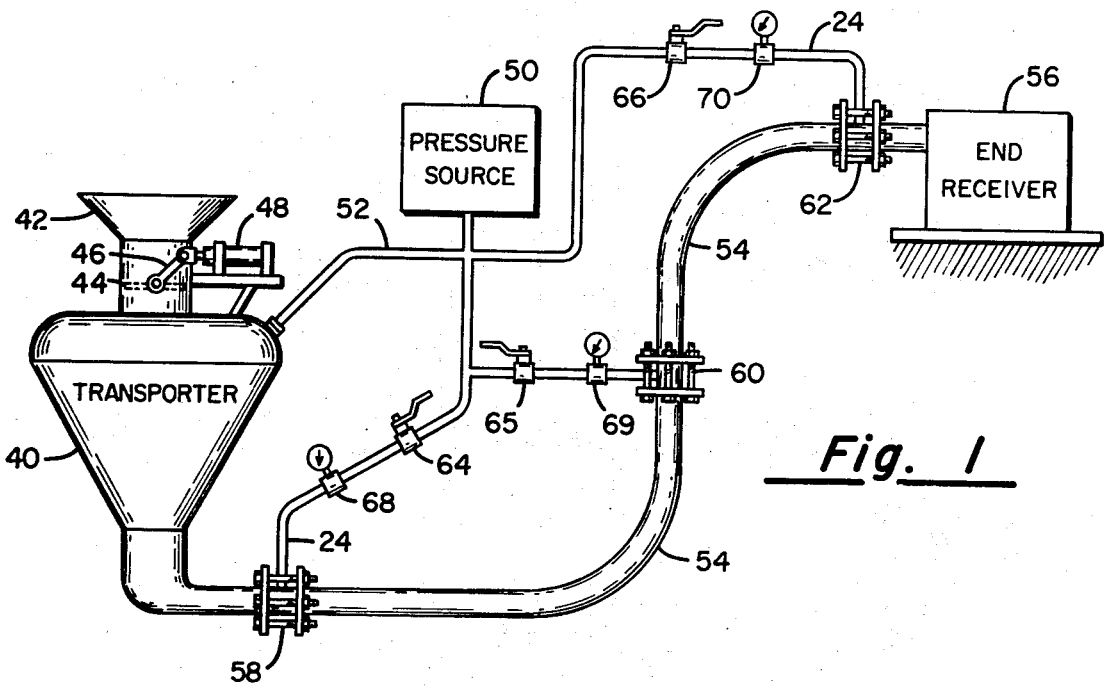
FIG. 1 is a diagrammatic view of a typical pressurized pneumatic conveyor of the type in which the present invention has maximum utility.

FIG. 1 demonstrates a typical pneumatic conveyor system. The material to be transported is introduced into a pressurized transporter 40 by a hopper 42 and a butterfly valve 44 which is activated by an air cylinder 48 or any other suitable apparatus. Transportation is effected by closing valve 44 and pressurizing transporter 40 with a gas such as air supplied by a source 50 through a line 52. The pressurized air pushes the material along a pneumatic conveyor tube 54 to any desired location such as a receiver 56. As mentioned earlier, this type of system requires a number of booster valves 58, 60 and 62 which add additional air to tube 54 at suitable successive locations. In the example shown, pressurized air from source 50 travels through three manually adjustable valves 64, 65 and 66, through three meters 68, 69 and 70, and into the three booster valves 58, 60 and 62. The unique design of the booster valves of the present invention is shown in FIG. 2.

In FIG. 2 conveyor tube 54 is again shown. Tube 54 is divided into two portions to permit insertion of the valve. The first portion is machined to have a beveled edge 32 while the second portion is shaped to have an annular lip 30. An annular flexible valve member 28 slides over lip 30 and extends across to contact beveled edge 32. Flexible member 28 may be constructed from a variety of materials, rubber being contemplated for the preferred embodiment. Each of the two portions of tube 54 is secured by a suitable collar 12 or 14 which is welded or otherwise fastened to tube 54. An annular ring or tube 20 separates collars 12 and 14 while a plurality of bolts such as bolts 16 and 18 compress collars 12 and 14 and therefore hold the two portions of tube 54 in place. In this way an annular, pressure tight housing or chamber 26 is formed about tube 54. Air is introduced into chamber 26 by means of a line 24 which, of course, is angled to clear bolt 18. If the pressure in chamber 26 exceeds that inside tube 54 by a sufficient amount, the rubber member 28 is displaced and air enters tube 54 to help move the material therein.

Figure 2:
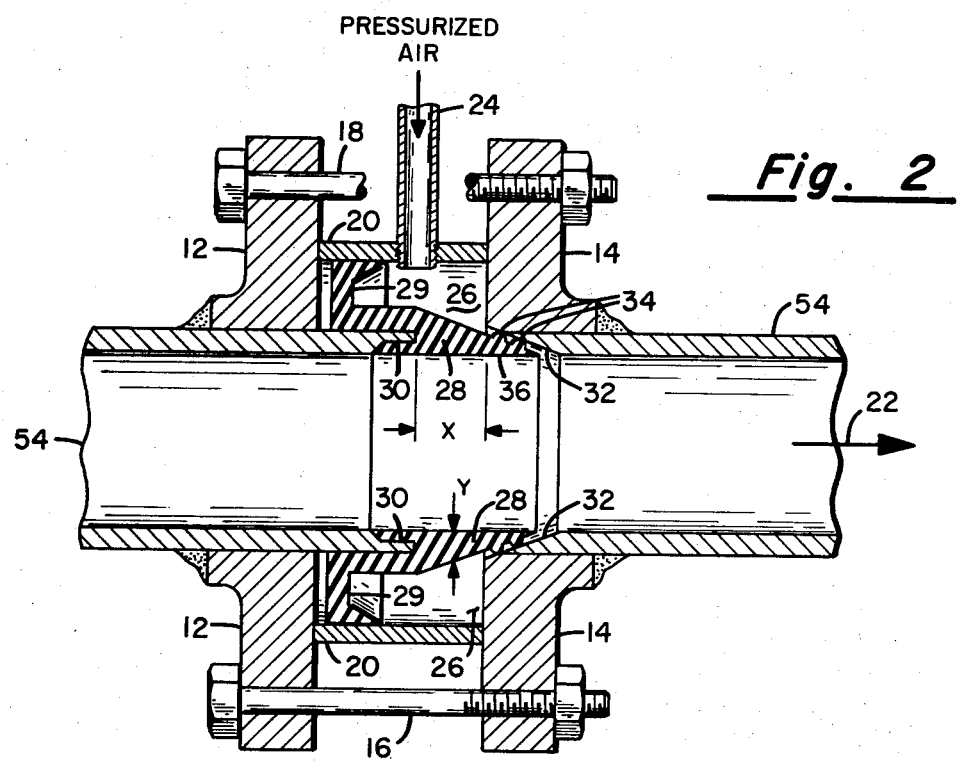
FIG. 2 is a schematic sectional view of one preferred embodiment of the present invention.

The design described in FIG. 2 possesses a number of advantageous design features which make it far superior to prior art approaches. Material in the tube moves in the direction indicated by arrow 22. Beveled edge 32 and the corresponding face of rubber member 28 insure that air enters tube 54 in substantially the same direction as the flow thus helping the flow and removing any tendency of the material to back up into the air admission passage. Also, the nature of the valve is such as to progressively close as the pressure differential decreases. When the pressure differential reaches a predetermined "cracking" value, the flexible rubber member 28 will resume its natural shape and seal the opening so that rubber valve 28 is compressed tightly against edge 32 leaving no holes, slots or ridges upon which material can accumulate.

In the preferred embodiments, "cracking" pressures of from 1 to 3 pounds per square inch have been experienced with the valve disclosed herein. Because of this minimum differential cracking pressure, the valve really closes before there is any tendency for the transported material to back up into housing chamber 26. This is important because the slightest amount of material can operate to hold any valve open causing a leak backwards through the valve.

Surface 36 presents a smooth continuous surface to the moving material so that the interior dimensional continuity of tube 54 is nearly unbroken. This is especially true in the normal operating mode where a small amount of air is passing into the tube. Flexible member 28 is shaped and positioned to approximate the internal dimensions of tube 54 when it is displaced to admit air to tubes 54.

Additional important design features include a pair of pressure ridges 34, which encourage a tight seal when flexible valve member 28 is closed, and an annular extended portion 29 which expands against the walls of chamber 26 due to pressure in chamber 26 thus firmly holding member 28 in place. This holding action is sufficient to permit the removal of lip 30 in the preferred embodiment. However, this lip 30 has been shown in FIG. 2 by way of a complete disclosure. It should be noted that flexible member 28 compresses evenly over its entire circumference when admitting air as has been proven by experimentation. This is true because the average thickness of the sleeve approximated at the center of the sleeve by the measurement Y in FIG. 2 is great enough in comparison to the unsupported length of the sleeve X to insure that the sleeve has strength enough to retain its natural shape. It has been found that if the average thickness Y is reduced, flexible member 28 will buckle in from the weakest side first admitting air to tube 54 on one side only whereas if the average thickness Y is too great, the cracking pressure becomes too large. Another problem that can arise in the prior art is experienced when clogs or other abnormalities cause a high pressure surge in tube 54. These high pressures can bend flexible member 28 into chamber 26 and clog chamber 26 with material if the Y dimension is inadequate. For ordinary rubber materials the flexible member 28 has been found to work best with the ratio of X to Y being in the range of about 1 to 1 up to about 6 to 1. The preferred embodiment of FIG. 2, for example, is constructed with the ratio of X to Y being about 4 to 1. In order to avoid the design limitations of the above-mentioned ratios and still have the proper cracking pressure characteristics, the embodiment of FIG. 3 is useful although requiring more complicated castings.

Figure 3:
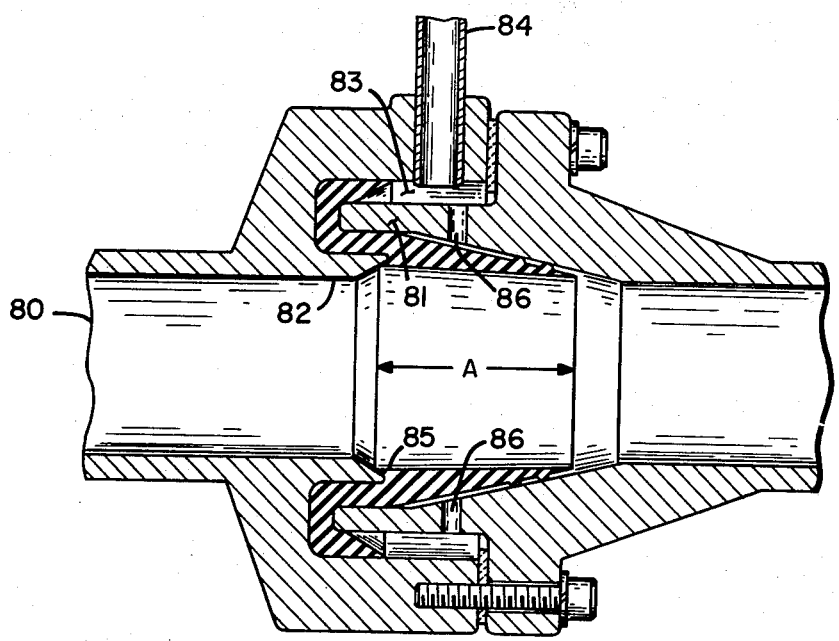
FIG. 3 is a schematic sectional view of another preferred embodiment of my invention particularly adapted to withstand large back pressures.

In FIG. 3 a conveying tube 80 is provided with interlocking or overlapping annular lips 81 and 82. Pressurized air is introduced into annular housing 83 from a tube 84 where the air can reach the back side of annular flexible valve member 85 through a series of circumferentially spaced holes 86. Any number of holes 86 may be used as long as they are spaced to give an even distribution of air. It is clear in FIG. 3 that flexible member 85 rests primarily against annular lip 81 about its entire circumference and thus can withstand very high back pressures in the tube 80. High back pressures simply operate to seal flexible member 85 tightly against lip 81. Thus, a thinner valve member 85 may be utilized. Experimentation has proven that the ratio of the area of the sealing surface between flexible member 85 and annular lip 81, measured across the length of tube opening defined by the letter A in FIG. 3, to the total area of the spaced holes 86 should lie in the range of about 10 to 1 up to about 500 to 1. The preferred embodiment contemplated by FIG. 3 has a ratio of about 30 to 1, but this ratio may be varied as desired to control the cracking pressure so as to insure against any backing up of the conveyed granular material into the valve sealing area.

I claim:

1. In pneumatic conveying apparatus a booster valve in combination with a conveying tube comprising:
   a pressure tight housing disposed about the tube in fluid communication with the inside of the tube by means of an opening through the wall of the tube;
   a generally annular flexible member covering the tube opening;
   a rigid annular lip extending over the length of the tube opening surrounding said flexible member for providing support therefor against back pressures in the tube;
   passageways through said lip;
   said flexible member operable by means of pressure induced flexing displacement to permit the flow of fluid from said passageways into said tube if the pressure in the housing exceeds the pressure in the tube by a predetermined amount but resistant to flow from said tube into said housing; and
   a source of fluid pressure connected to said housing adapted to present a substantially constant predetermined pressure to said passageways.

2. The apparatus of claim 5 in which the outer surface of said flexible member is tapered so that said flexing displacement opens a path from the passageways to the tube opening which is generally in the direction of flow of material in said tube.

3. The apparatus of claim 2 including at least one pressure ridge on the tube contacting surface of said flexible member operable to insure a tight seal between said tube and said flexible member.

4. The apparatus of claim 2 in which said passageways comprise a plurality of holes arranged generally orthogonal to the flow of material in said tube through which fluid passes from said housing against the tapered surface of said flexible member.

5. The apparatus of claim 4 in which said annular lip extends beyond the length of the tube opening so as to overlap an end of the tube with said annular flexible member therebetween.

6. The apparatus of claim 5 in which the ratio of the area of said annular lip supporting said flexible member over the length of the tube opening to the area of said plurality of holes lies in the range of about 10 to 1 to about 500 to 1.

7. The apparatus of claim 6 in which said ratio is about 30 to 1.

* * * * *